(12) United States Patent
Ono et al.

(10) Patent No.: US 11,305,370 B2
(45) Date of Patent: Apr. 19, 2022

(54) ARC WELDING CONTROL METHOD (71) Applicant: DAIHEN CORPORATION, Osaka (JP)

(72) Inventors: Kohei Ono, Osaka (JP); Toshiaki Nakamata, Osaka (JP)

(73) Assignee: DAIHEN CORPORATION, Osaka (JP)

( * ) Notice: Subject to any disclaimer, the term of this patent is extended or adjusted under 35 U.S.C. 154(b) by 349 days.

(21) Appl. No.: 16/338,870

(22) PCT Filed: Sep. 28, 2017

(86) PCT No.: PCT/JP2017/035341
§ 371 (c)(1),
(2) Date: Apr. 2, 2019

(87) PCT Pub. No.: WO2018/079183
PCT Pub. Date: May 3, 2018

(65) Prior Publication Data
US 2020/0139476 A1     May 7, 2020

(30) Foreign Application Priority Data

Oct. 31, 2016  (JP) .............................. JP2016-213269
Nov. 30, 2016  (JP) .............................. JP2016-232039

(51) Int. Cl.
*B23K 9/23* (2006.01)
*B23K 9/09* (2006.01)
*B23K 9/12* (2006.01)
(52) U.S. Cl.
CPC ................ *B23K 9/23* (2013.01); *B23K 9/093* (2013.01); *B23K 9/125* (2013.01)

(58) Field of Classification Search
CPC .......... B23K 9/09; B23K 9/093; B23K 9/125; B23K 9/23
See application file for complete search history.

(56) References Cited

U.S. PATENT DOCUMENTS

2008/0156781 A1   7/2008  Artelsmair et al.
2014/0202993 A1   7/2014  Kawamoto et al.
(Continued)

FOREIGN PATENT DOCUMENTS

JP      61-253175       11/1986
JP      2001-121262      5/2001
(Continued)

OTHER PUBLICATIONS

Extended Search Report, European Patent Office, Application No. 17864966.1, dated Jul. 1, 2020.
(Continued)

*Primary Examiner* — Erin E McGrath
(74) *Attorney, Agent, or Firm* — Greenblum & Bernstein, P.L.C.

(57) ABSTRACT

In an arc welding control method for controlling welding in which a material of a base material is a galvanized steel sheet, a feed speed of a welding wire is alternately switched between a forward feed period and a reverse feed period, and a short circuit period and an arc period are repeated, during the arc period, a first arc period Ta1 during which a first arc current Ia1 is applied, a second arc period Ta2 during which a second arc current Ia2 is applied, and a third arc period Ta3 during which a third arc current Ia3 is applied are switched over time, and it is controlled so as to be Ia1>Ia2>Ia3. Constant voltage control is performed during the second arc period Ta2, and constant current control is performed during the first arc period Ta1.

12 Claims, 4 Drawing Sheets

(56) References Cited

U.S. PATENT DOCUMENTS

| | | | |
|---|---|---|---|
| 2015/0096965 A1 | 4/2015 | Kawamoto et al. | |
| 2015/0096966 A1 | 4/2015 | Fujiwara et al. | |
| 2019/0224771 A1* | 7/2019 | Fujiwara | B23K 9/124 |

FOREIGN PATENT DOCUMENTS

| | | |
|---|---|---|
| JP | 2008-531283 | 8/2008 |
| JP | 2014-226709 | 12/2014 |
| WO | 2013/132550 | 9/2013 |
| WO | 2014/054261 | 4/2014 |

OTHER PUBLICATIONS

Written Opinion of the International Searching Authority issued in International Application No. PCT/JP2017/035341, dated Nov. 14, 2017.
International Search Report issued in International Patent Application No. PCT/JP2017/035341, dated Nov. 14, 2017.
Japanese Office Action, JPO, Application No. 2018-547500, dated May 6, 2021, English translation.

\* cited by examiner

ARC WELDING CONTROL METHOD

TECHNICAL FIELD

The present invention relates to an arc welding control method for controlling welding in which a material of a base material is a galvanized steel sheet, a feed speed of a welding wire is alternately switched between a forward feed period and a reverse feed period, a short circuit period and an arc period are repeated.

BACKGROUND ART

In general consumable electrode-type arc welding, the welding is performed by feeding a welding wire as a consumable electrode at a constant speed, and generating an arc between the welding wire and a base material. In the consumable electrode-type arc welding, a welding state of alternately repeating the welding wire and the base material in a short circuit period and an arc period is often obtained.

In order to further improve the welding quality, a welding method of periodically repeating forward feed and reverse feed of a welding wire has been proposed (see, for example, Patent Literature 1).

PRIOR ART LITERATURE

Patent Literature

Patent Literature 1: JP-T-2008-531283

SUMMARY OF INVENTION

Problem to be Solved by the Invention

In arc welding for the galvanized steel sheet, during the welding, zinc on the surface of the base material turns into vapor due to the arc heat, which is ejected as gas from a molten pool, resulting in a phenomenon that the welding state is unstable. In addition, the gas ejection phenomenon is prominent in arc welding in which the feed speed of the welding wire is alternately switched between the forward feed period and the reverse feed period, as compared with general arc welding in which the feed speed is constant.

Accordingly, the present invention is to provide an arc welding control method capable of stabilizing a welding state and reducing a spatter generation amount in arc welding in which the material of a base material is a galvanized steel sheet and a feed speed of a welding wire is alternately switched between a forward feed period and a reverse feed period.

Means for Solving the Problem

An arc welding control method according to the present disclosure relates to
an arc welding control method for controlling welding in which a material of a base material is a galvanized steel sheet, a feed speed of a welding wire is alternately switched between a forward feed period and a reverse feed period, and a short circuit period and an arc period are repeated, wherein
during the arc period, a first arc period during which a first arc current Ia1 is applied, a second arc period during which a second arc current Ia2 is applied, and a third arc period during which a third arc current Ia3 is applied are switched over time, and
it is controlled so as to be Ia1>Ia2>Ia3.

In the arc welding control method according to the present disclosure, constant voltage control is performed during the second arc period.

In the arc welding control method according to the present disclosure, constant current control is performed during the first arc period.

In the arc welding control method according to the present disclosure, a value of the first arc period and/or the first arc current is set to a value such that zinc vapor does not remain in a molten pool after being discharged from the molten pool.

In the arc welding control method according to the present disclosure, the value of the first arc period and/or the first arc current Ia1 changes according to a zinc deposition amount per unit area of the base material.

In the arc welding control method according to the present disclosure, a waveform parameter of the feed speed is set so that an average value of repetition frequencies of the forward feed period and the reverse feed period is in a range of 70 Hz to 90 Hz.

In the arc welding control method according to the present disclosure, the waveform parameter is at least a forward feed peak value and a reverse feed peak value.

In the arc welding control method according to the present disclosure, the waveform parameter is set so that the average value of the repetition frequencies lowers as the zinc deposition amount per unit area of the base material increases.

Effects of Invention

According to the present invention, a welding state can be stabilized and a spatter generation amount can be reduced in arc welding in which the material of a base material is a galvanized steel sheet and a feed speed of a welding wire is alternately switched between a forward feed period and a reverse feed period.

EMBODIMENTS FOR CARRYING OUT THE INVENTION

Hereinafter, embodiments of the present invention will be described with reference to the drawings.

First Embodiment

Figure 1:
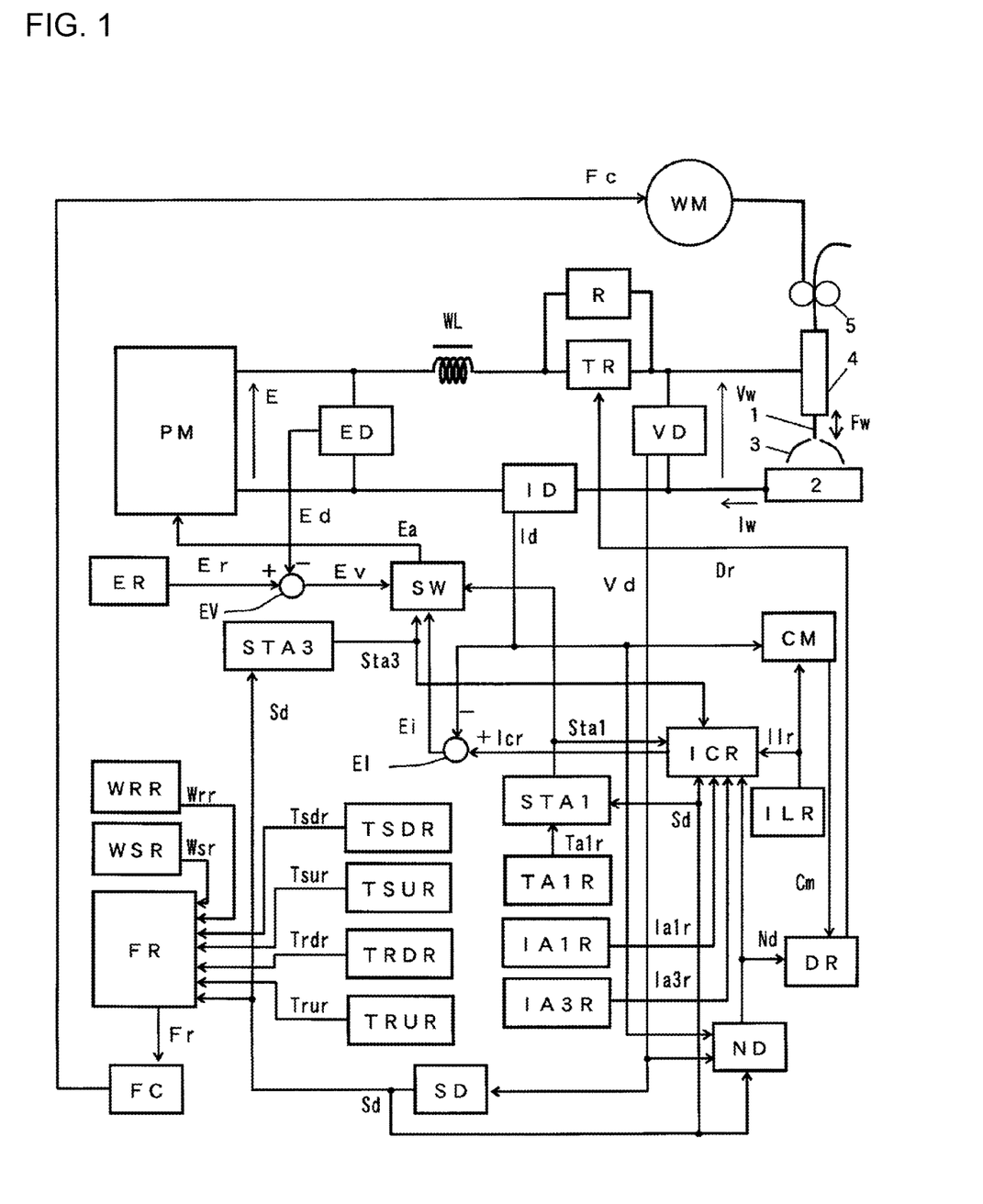
FIG. 1 is a block diagram of a welding power source for performing an arc welding control method according to a first embodiment of the present invention.

FIG. 1 is a block diagram of a welding power source for performing an arc welding control method according to a first embodiment of the present invention. Hereinafter, each block will be described below with reference to FIG. 1.

A power source main circuit PM receives an output from a 3-phase 200 V commercial power source (not shown) or the like, performs output control by inverter control according to an error amplification signal Ea to be described later, and outputs an output voltage E. The power source main circuit PM includes a primary rectifier for rectifying the commercial power source, a smoothing capacitor for smoothing a rectified direct current, an inverter circuit driven by the error amplification signal Ea that converts the smoothed direct current into a high-frequency alternating current, a high-frequency transformer for stepping down the high-frequency alternating current to a voltage value suitable for welding, and a secondary rectifier for rectifying the step-down high-frequency alternating current into a direct current, which are not shown.

A reactor WL smoothes the output voltage E. The inductance value of the reactor WL is, for example, 100 µH.

A feed motor WM receives a feed control signal Fc to be described later as an input and alternately repeats forward feed and reverse feed to feed a welding wire 1 at a feed speed Fw. A motor with fast transient response is used as the feed motor WM. In order to increase the change rate of the feed speed Fw of the welding wire 1 and speed up the reversal of the feed direction, the feed motor WM may be installed near a tip of a welding torch 4. In addition, two feed motors WM may be used to form a push-pull type feed system.

The welding wire 1 is fed inside the welding torch 4 by the rotation of a feed roll 5 coupled to the feed motor WM, and an arc 3 is generated between the welding wire 1 and a base material 2. A welding voltage Vw is applied between the power source tip (not shown) in the welding torch 4 and the base material 2, and thus a welding current Iw is applied. The material of the base material 2 is a galvanized steel sheet.

An output voltage setting circuit ER outputs a predetermined output voltage setting signal Er. An output voltage detection circuit ED detects and smoothes the output voltage E and outputs an output voltage detection signal Ed.

A voltage error amplification circuit EV receives the output voltage setting signal Er and the output voltage detection signal Ed as inputs, amplifies an error between the output voltage setting signal Er(+) and the output voltage detection signal Ed(−), and outputs a voltage error amplification signal Ev.

A current detection circuit ID detects the welding current Iw and outputs a current detection signal Id. A voltage detection circuit VD detects the welding voltage Vw and outputs a voltage detection signal Vd. A short circuit determination circuit SD receives the voltage detection signal Vd as an input, and outputs a short circuit determination signal Sd which is determined to be at a short circuit period and at a high level when the value of the voltage detection signal Vd is less than a predetermined short circuit determination value (about 10 V), and is determined to be at an arc period and at a low level when the value of the voltage detection signal Vd is equal to or larger than the predetermined short circuit determination value.

A forward feed acceleration period setting circuit TSUR outputs a predetermined forward feed acceleration period setting signal Tsur.

A forward feed deceleration period setting circuit TSDR outputs a predetermined forward feed deceleration period setting signal Tsdr.

A reverse feed acceleration period setting circuit TRUR outputs a predetermined reverse feed acceleration period setting signal Trur.

A reverse feed deceleration period setting circuit TRDR outputs a predetermined reverse feed deceleration period setting signal Trdr.

A forward feed peak value setting circuit WSR outputs a predetermined forward feed peak value setting signal Wsr.

A reverse feed peak value setting circuit WRR outputs a predetermined reverse feed peak value setting signal Wrr.

A feed speed setting circuit FR receives the forward feed acceleration period setting signal Tsur, the forward feed deceleration period setting signal Tsdr, the reverse feed acceleration period setting signal Trur, the reverse feed deceleration period setting signal Trdr, the forward feed peak value setting signal Wsr, the reverse feed peak value setting signal Wrr and the short circuit determination signal Sd as inputs, and outputs a feed speed pattern generated by the following process as a feed speed setting signal Fr. When the feed speed setting signal Fr is 0 or more, it becomes a forward feed period, and when the feed speed setting signal Fr is less than 0, it becomes a reverse feed period.

1) During a forward feed acceleration period Tsu determined by the forward feed acceleration period setting signal Tsur, a feed speed setting signal Fr which is linearly accelerated from 0 to a forward feed peak value Wsp, i.e., a positive value, determined by the forward feed peak value setting signal Wsr is output.

2) Then, during a forward feed peak period Tsp, a feed speed setting signal Fr for maintaining the forward feed peak value Wsp is output.

3) When the short circuit determination signal Sd changes from a low level (arc period) to a high level (short circuit period), the period is shifted to a forward feed deceleration period Tsd determined by the forward feed deceleration period setting signal Tsdr, and a feed speed setting signal Fr which is linearly decelerated from the forward feed peak value Wsp to 0 is output.

4) Then, during a reverse feed acceleration period Tru determined by the reverse feed acceleration period setting signal Trur, a feed speed setting signal Fr which is linearly accelerated from 0 to a reverse feed peak value Wrp, i.e., a negative value, determined by the reverse feed peak value setting signal Wrr is output.

5) Then, during a reverse feed peak period Trp, a feed speed setting signal Fr for maintaining the reverse feed peak value Wrp is output.

6) When the short circuit determination signal Sd changes from a high level (short circuit period) to a low level (arc period), the period is shifted to a reverse feed deceleration period Trd determined by the reverse feed deceleration period setting signal Trdr, and a feed speed setting signal Fr which is linearly decelerated from the reverse feed peak value Wrp to 0 is output.

7) By repeating the steps 1) to 6), the feed speed setting signal Fr of a feed pattern changing into a positive or negative trapezoidal wave is generated.

A feed control circuit FC receives the feed speed setting signal Fr as an input and outputs a feed control signal Fc for feeding the welding wire 1 at a feed speed Fw equivalent to the value of the feed speed setting signal Fr to the feed motor WM.

A current-limiting resistor R is inserted between the reactor WL and the welding torch 4. Th value of the current-limiting resistor R is set to a value (about 0.5Ω to 3Ω) that is 10 times or more larger than a short circuit load (about 0.01Ω to 0.03Ω). When the current-limiting resistor is inserted in the current path, the energy stored in the reactor WL and a reactor of the external cable is rapidly discharged.

A transistor TR is connected in parallel to the current-limiting resistor R and is controlled to be turned on or off according to a drive signal Dr to be described later.

A constriction detection circuit ND receives the short circuit determination signal Sd, the voltage detection signal Vd and the current detection signal Id as inputs, and outputs a constriction detection signal Nd, which is at a high level when it is determined that a formation state of the constriction has reached a reference state when a voltage rise value of the voltage detection signal Vd at a time when the short circuit determination signal Sd is at a high level (short circuit period) reaches a reference value, and which is at a low level at the time when the short circuit determination signal Sd changes to be at a low level (arc period). In addition, the constriction detection signal Nd may be changed to be at a high level when the differential value of the voltage detection signal Vd at a time when the short circuit period reaches the corresponding reference value. Further, a value of the voltage detection signal Vd is divided by a value of the current detection signal Id to calculate a resistance value of the droplet and at a time when the differential value of the resistance value reaches the corresponding reference value, the constriction detection signal Nd may be set to be at a high level.

A low level current setting circuit ILR outputs a predetermined low level current setting signal Ilr. A current comparison circuit CM receives the low level current setting signal Ilr and the current detection signal Id as inputs and outputs a current comparison signal Cm which is at a high level when Id<Ilr and at a low level when Id>Ilr.

A drive circuit DR receives the current comparison signal Cm and the constriction detection signal Nd as inputs, and outputs the drive signal Dr, which changes to be at a low level when the constriction detection signal Nd changes to be at a high level and thereafter changes to be at a high level when the current comparison signal Cm changes to be at a high level, to a base terminal of the transistor TR. Therefore, when the constriction is detected, the drive signal Dr changes to be at a low level, the transistor TR is turned off, and the current-limiting resistor R is inserted in the current path, so that the welding current Iw for passing the short circuit load decreases rapidly. Further, when the value of the rapidly decreased welding current Iw decreases to the value of the low level current setting signal Ilr, the drive signal Dr changes to be at a high level and the transistor TR is turned on, so that the current-limiting resistor R is short-circuited and returns to a normal state.

A first arc period setting circuit TA1R outputs a predetermined first arc period setting signal Ta1r. A first arc period circuit STA1 receives the short circuit determination signal Sd and the first arc period setting signal Ta1r as inputs, and outputs a first arc period signal Sta1 which changes to be at a high level during a first arc period Ta1 predetermined by the first arc period setting signal Ta1r from a time when a predetermined delay period Tc elapses after the short circuit determination signal Sd changes to be at a low level (arc period).

A first arc current setting circuit IA1R outputs a predetermined first arc current setting signal Ia1r.

A third arc period circuit STA3 receives the short circuit determination signal Sd as an input, and outputs a third arc period signal Sta3 which changes to be at a high level at a time when a predetermined current drop time Td elapses from a time when the short circuit determination signal Sd changes to be at a low level (arc period), and thereafter changes to be at a low level when the short circuit determination signal Sd changes to be at a high level (short circuit period).

A third arc current setting circuit IA3R outputs a predetermined third arc current setting signal Ia3r.

A current control setting circuit ICR receives the short circuit determination signal Sd, the low-level current setting signal Ilr, the constriction detection signal Nd, the first arc period signal Sta1, the third arc period signal Sta3, the first arc current setting signal Ia1r, and the third arc current setting signal Ia3r as inputs, and outputs a current control setting signal Icr by performing the following process.

1) During the delay period from the time when the short circuit determination signal Sd changes to be at a low level (arc period) until the first arc period signal Sta1 changes to be at a high level, a current control setting signal Icr having a value of the low-level current setting signal Ilr is output.

2) When the first arc period signal Sta1 is at a high level (first arc period), a current control setting signal Icr which becomes the first arc current setting signal Ia1r is output.

3) During a period (the second arc period and the third arc period) from a time when the first arc period signal Sta1 changes to be at a low level until a time when the third arc period signal Sta3 changes to be at a low level, a current control setting signal Icr which becomes the third arc current setting signal Ia3r is output.

4) When the short circuit determination signal Sd changes to be at a high level (short circuit period), a current control setting signal Icr is output, which becomes a predetermined initial current setting value during a predetermined initial period, and thereafter increases to a predetermined short circuit peak setting value and maintains this value during a predetermined short circuit inclination.

5) Thereafter, when the constriction detection signal Nd changes to be at a high level, a current control setting signal Icr having a value of the low-level current setting signal Ilr is output.

A current error amplification circuit EI receives the current control setting signal Icr and the current detection signal Id as inputs, amplifies an error between the current control setting signal Icr(+) and the current detection signal Id(−), and outputs a current error amplification signal Ei.

A power source characteristic switching circuit SW receives the current error amplification signal Ei, the voltage error amplification signal Ev, the first arc period signal Sta1, and the third arc period signal Sta3 as inputs, and outputs an error amplification signal Ea by performing the following process.

1) During a second arc period Ta2 from the first arc period signal Sta1 changes to be at a low level until the third arc period signal Sta3 changes to be at a high level, the voltage error amplification signal Ev is output as the error amplification signal Ea.

2) During other periods, the current error amplification signal Ei is outputs as the error amplification signal Ea.

With this circuit, the characteristic of the welding power source becomes a constant current characteristic during the short circuit period, the delay period, the first arc period Ta1 and the third arc period Ta3, and becomes a constant voltage characteristic during the second arc period Ta2.

Figure 2:
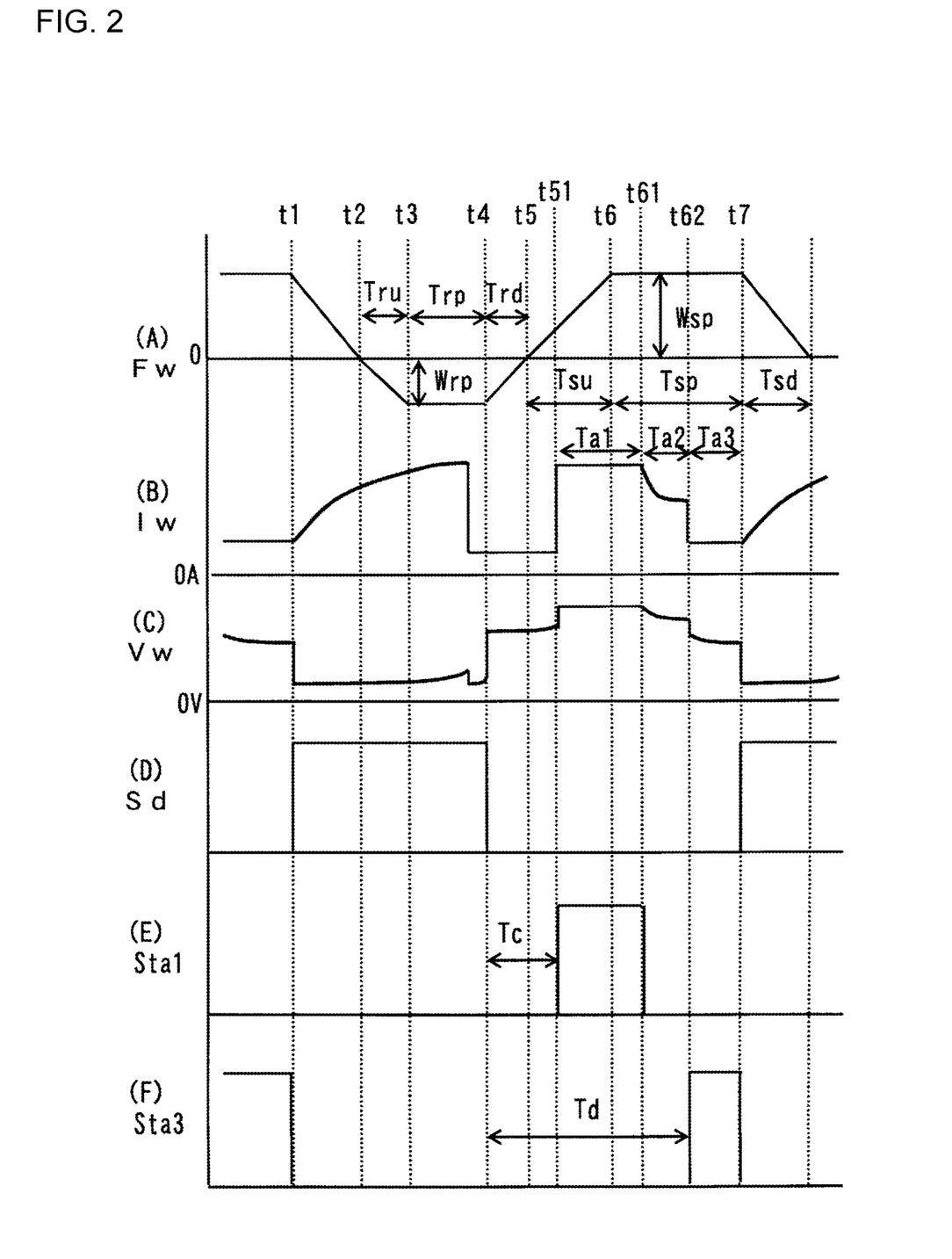
FIG. 2 is a timing chart of each signal in the welding power source of FIG. 1 showing the arc welding control method according to the first embodiment of the present invention.

FIG. 2 is a timing chart of each signal in the welding power source of FIG. 1 showing the arc welding control method according to the first embodiment of the present invention. (A) of FIG. 2 shows a time change of the feed speed Fw with time, (B) of FIG. 2 shows the change of the welding current 1w with time, (C) of FIG. 2 shows the change of the welding voltage Vw with time, (D) of FIG. 2 shows the change of the short circuit determination signal Sd with time, (E) of FIG. 2 shows the change of the first arc period signal Sta1 with time, and (F) of FIG. 2 shows the change of the third arc period signal Sta3 with time. Hereinafter, the operation of each signal will be described below with reference to FIG. 2.

The feed speed Fw shown in (A) of FIG. 2 is controlled to the value of the feed speed setting signal Fr output from the feed speed setting circuit FR of FIG. 1. The feed speed Fw includes the forward feed acceleration period Tsu determined by the forward feed acceleration period setting signal Tsur of FIG. 1, the forward feed peak period Tsp continuing until a short circuit occurs, the forward feed deceleration period Tsd determined by the forward feed deceleration period setting signal Tsdr of FIG. 1, the reverse feed acceleration period Tru determined by the reverse feed acceleration period setting signal Trur of FIG. 1, the reverse feed peak period Trp continuing until an arc occurs, and the reverse feed deceleration period Trd determined by the reverse feed deceleration period setting signal Trdr of FIG. 1. Further, the forward feed peak value Wsp is determined by the forward feed peak value setting signal Wsr of FIG. 1, and the reverse feed peak value Wrp is determined by the reverse feed peak value setting signal Wrr of FIG. 1. As a result, the feed speed setting signal Fr is a feed pattern changing into a positive or negative substantially trapezoidal wave shape.

[Operation During Short Circuit Period from Time Points t1 to t4]

When a short circuit occurs at a time point t1 during the forward feed peak period Tsp, the welding voltage Vw rapidly decreases to a short-circuit voltage value of several volts as shown in (C) of FIG. 2, so that the short circuit determination signal Sd changes to be at a high level (short circuit period) as shown in (D) of FIG. 2. In response to this, the period is shifted to a predetermined forward feed deceleration period Tsd from time points t1 to t2, and the feed speed Fw decelerates from the forward feed peak value Wsp to 0, as shown in (A) of FIG. 2. For example, the forward feed deceleration period Tsd is set to be 1 ms.

As shown in (A) of FIG. 2, the feed speed Fw enters a predetermined reverse feed acceleration period Tru from time points t2 to t3, and accelerates from 0 to the reverse feed peak value Wrp. During this period, the short circuit period continues. For example, the reverse feed acceleration period Tru is set to be 1 ms.

When the reverse feed acceleration period Tru ends at the time point t3, the feed speed Fw enters the reverse feed peak period Trp and becomes the reverse feed peak value Wrp, as shown in (A) of FIG. 2. The reverse feed peak period Trp continues until an arc occurs at a time point t4. Therefore, the time period from time points t1 to t4 is a short circuit period. The reverse feed peak period Trp is not a predetermined value, and is about 4 ms. For example, the reverse feed peak value Wrp is set to be −20 m/min to −50 m/min.

As shown in (B) of FIG. 2, the welding current Iw during the short circuit period from the time points t1 to t4 is a predetermined initial current value during the predetermined initial period. Thereafter, the welding current Iw increases to the predetermined short circuit peak value and maintains the this value during the predetermined short circuit inclination.

As shown in (C) of FIG. 2, the welding voltage Vw increases when the welding current Iw becomes the short circuit peak value. This is because a constriction is gradually formed in the droplet at the tip of the welding wire 1 due to the reverse feed of the welding wire 1 and the action of the pinching force caused by the welding current Iw.

Thereafter, when the voltage rise value of the welding voltage Vw reaches the reference value, it is determined that the formation state of the constriction has reached the reference state, and the constriction detection signal Nd in FIG. 1 changes to be at a high level.

In response to the constriction detection signal Nd changing to be at a high level, the drive signal Dr of FIG. 1 changes to be at a low level, so that the transistor TR of FIG. 1 is turned off, and the current-limiting resistor R of FIG. 1 is inserted in the current path. At the same time, the current control setting signal Icr of FIG. 1 decreases to the value of the low-level current setting signal Ilr. Thus, as shown in (B) of FIG. 2, the welding current Iw rapidly decreases from the short circuit peak value to a low-level current value. Further, when welding current Iw decreases to the low-level current value, the drive signal Dr returns to be at a high level, so that the transistor TR is turned on and the current-limiting resistor R is short-circuited. As shown in (B) of FIG. 2, since the current control setting signal Icr remains the low level current setting signal Ilr, the welding current Iw maintains the low-level current value until a predetermined delay period Tc elapses after the arc is regenerated. Therefore, the transistor TR is turned off only during the period from when the constriction detection signal Nd changes to be at a high level until the welding current Iw decreases to the low-level current value. As shown in (C) of FIG. 2, the welding voltage Vw rapidly increases after temporarily decreasing since the welding current Iw decreases. Each of the above parameters is set to, for example, the following value. Initial current=40 A, initial period=0.5 ms, short circuit inclination=2 ms, short circuit peak value=400 A, low-level current value=50 A, delay period Tc=1 ms.

[Operation During Arc Period from Time Points t4 to t7]

When the constriction forms due to the reverse feed of the welding wire and the pinch force caused by the application of the welding current Iw and an arc is generated at the time point t4, the welding voltage Vw rapidly increases to an arc voltage value of several tens of volts, as shown in (C) of FIG. 2. Therefore, the short circuit determination signal Sd changes to be at a low level (arc period), as shown in (D) of FIG. 2. In response to this, the period is shifted to a predetermined reverse feed deceleration period Trd from time points t4 to t5, and the feed speed Fw decelerates from the reverse feed peak value Wrp to 0, as shown in (A) of FIG. 2.

When the reverse feed deceleration period Trd ends at the time point t5, the period is shifted to a predetermined forward feed acceleration period Tsu from time points t5 to t6. As shown in (A) of FIG. 2, during the forward feed acceleration period Tsu, the feed speed Fw is accelerated from 0 to the forward feed peak value Wsp. During this period, the arc period continues. For example, the forward feed acceleration period Tsu is set to be 1 ms.

When the forward feed acceleration period Tsu ends at the time point 6, the feed speed Fw enters the forward feed peak period Tsp and becomes the forward feed peak value Wsp as shown in (A) of FIG. 2. During this period, the arc period also continues. The forward feed peak period Tsp continues until an short circuit occurs at a time point t7. Therefore, the time period from time points t4 to t7 is an arc period. When a short circuit occurs, the operation returns to the operation at the time point t1. The forward feed peak period Tsp is not a predetermined value, and is about 5 ms. For example, the forward feed peak value Wsp is set to be 20 m/min to 50 m/min.

When an arc occurs at time point t4, the welding voltage Vw rapidly increases to an arc voltage value of several tens of Volts, as shown in (C) of FIG. 2. As shown in (B) of FIG. 2, the welding current Iw continues the low-level current value during the delay period Tc from the time point t4. This is because when the current value increases immediately after the arc is generated, the reverse feed of the welding wire and the melting of the welding wire due to the welding current are added together, the arc length may rapidly increase and the welding state may be unstable.

When the delay period Tc ends at the time point t51 during the forward feed acceleration period Tsu, the first arc period signal Sta1 changes to be at a high level and shifts to the predetermined first arc period Ta1 at time points t51 to t61, as shown in (E) of FIG. 2. The constant current control is continued during the first arc period Ta1, and a predetermined first arc current Ia1 determined by the first arc current setting signal Ia1r in FIG. 1 is applied, as shown in (B) of FIG. 2. As shown in (B) of FIG. 2, the welding voltage Vw is a value determined by the current value and the arc load, which is a large value. For example, the first arc period Ta1 is set to be about 1 ms to 2 ms, and the first arc current Ia1 is set to be about 300 A to 500 A.

When a predetermined current drop time Td has elapsed at the time point t62 from the time point t4 when the arc is generated, the third arc period signal Sta3 changes to be at a high level as shown in (F) of FIG. 2. A period from time points t61 to 62 is a second arc period Ta2. The constant voltage control is performed during the second arc period Ta2. As shown in (B) of FIG. 2, the second arc current Ia2 varies depending on the arc load, and has a value smaller than the first arc current Ia1 and larger than the third arc current Ia3. That is, the output control is performed so as to be Ia1>Ia2>Ia3. As shown in (C) of FIG. 2, the welding voltage Vw is controlled to a predetermined value by the constant voltage control and becomes an intermediate value between the voltage value of the first arc period Ta1 and the voltage value of the third arc period Ta3. The second arc period Ta2 is not a predetermined value, and is about 3 ms to 6 ms.

The third arc period Ta3 is a period from the time point t62 when the third arc period signal Sta3 changes to be at a high level to the time point t7 when a short circuit occurs. The constant current control is performed during the third arc period Ta3. As shown in (B) of FIG. 2, a predetermined third arc current Ia3 determined by the third arc current setting signal Ia3r in FIG. 1 is applied. As shown in (C) of FIG. 2, the welding voltage Vw is a value determined by the current value and the arc load. For example, the third arc current Ia3 is set to be 60 A. The third arc period Ta3 is not a predetermined value, and is about 1 ms to 2 ms.

Hereinafter, the operational effects of the first embodiment will be described. According to the first embodiment, the arc period is mainly divided into three periods, i.e., the first arc period Ta1 during which the first arc current Ia1 is applied, the second arc period Ta2 during which the second arc current Ia2 is applied, and a third arc period Ta3 during which the third arc current Ia3 is applied, and the output control is performed. Ia1>Ia2>Ia3.

(1) When the first arc current Ia1 is set to a large current value, the heat input to the molten pool is increased, the discharge of zinc vapor from the molten pool is promoted, and thus good penetration is ensured. Therefore, the respective values of the first arc period Ta1 and/or the first arc current Ia1 are set so that the zinc vapor does not remain in the molten pool after being discharged from the molten pool.

(2) When the second arc current Ia2 is set to be smaller than the first arc current Ia1, explosive ejection of the zinc vapor from the molten pool is suppressed and the welding state is stabilized. The second arc current Ia2 is a current value capable of alleviating the generation of the zinc vapor.

(3) When the third arc current Ia3 is set to a smaller current value, the melting of the welding wire is suppressed, leading to a short circuit. Accordingly, the cycle of repeating the short circuit period and the arc period is stabilized and the welding state is stabilized. The third arc current Ia3 is set to a small current value to the extent that the welding wire does not melt.

Further, it is desirable that the constant voltage control is performed during the second arc period Ta2. By performing the constant voltage control during the period, the arc length can be maintained at an appropriate value, and the welding state can be stabilized.

Further, it is desirable that the constant current control is performed during the first arc period Ta1. When the constant current control is performed, the value of the first arc current Ia1 becomes a predetermined value regardless of the arc load. Thus, the amount of heat input to the molten pool during this period can be controlled to a desired value. As a result, discharge of the zinc vapor can be promoted by appropriate heat input. When the heat input amount in this period is excessive, the average value of the second arc current Ia2 during the second arc period Ta2 is lowered, leading to deterioration in the bead appearance. Therefore, it is important to optimize the heat input during this period.

Second Embodiment

In the invention according to the second embodiment, a value of the first arc period Ta1 and/or the first arc current Ia1 changes according to a zinc deposition amount per unit area of the base material.

Figure 3:
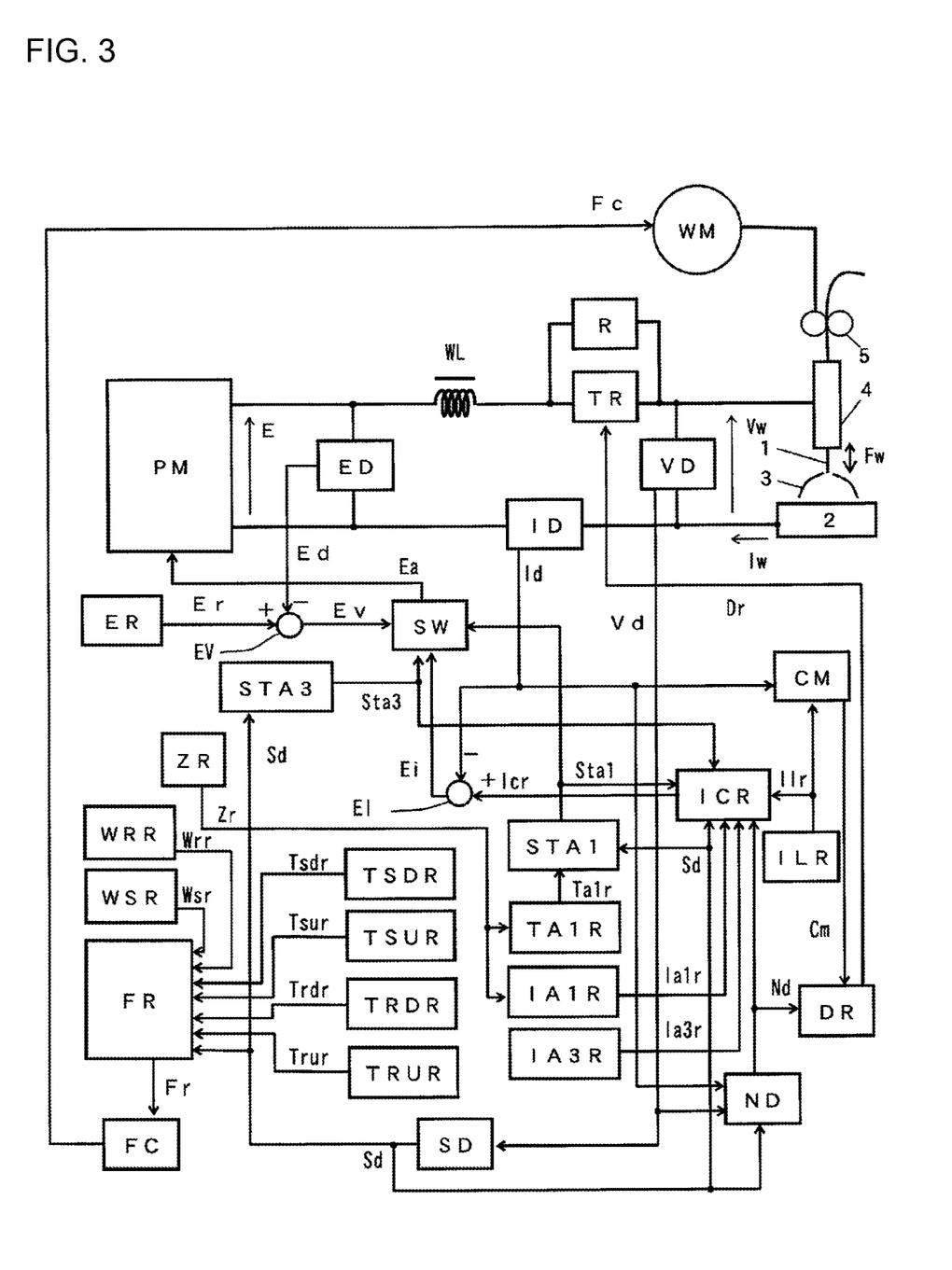
FIG. 3 is a block diagram of a welding power source for performing an arc welding control method according to a second embodiment of the present invention.

FIG. 3 is a block diagram of a welding power source for performing an arc welding control method according to the second embodiment of the present invention. FIG. 3 corresponds to FIG. 1 described above, in which the same reference numerals are attached to the same blocks, and description thereof will not be repeated. In FIG. 3, a zinc deposition amount setting circuit ZR is added as compared with FIG. 1, a first arc period setting circuit TA1R of FIG. 1 is replaced by a corrected first arc period setting circuit TA1R, and the first arc current setting circuit IA1R in FIG. 1 is replaced by a corrected first arc current setting circuit IA1R. Hereinafter, the blocks will be described below with reference to FIG. 3.

The zinc deposition amount setting circuit ZR outputs a zinc deposition amount setting signal Zr correlated with the zinc deposition amount per unit area of the base material. For example, the zinc deposition amount setting signal Zr is a signal for outputting a positive value of 1 to 5 corresponding to the position of a knob provided on a front panel of the welding power source. The standard value is 3. When a welding worker determines that the zinc deposition amount of the base metal is large, the knob is adjusted to adjust the standard value to 4 or 5. In contrast, when the welding worker determines that the zinc deposition amount of the base metal is small, the standard value is adjusted to 1 or 2.

The corrected first arc period setting circuit TA1R receives the zinc deposition amount setting signal Zr as an input and increases the value of the first arc period setting signal Ta1r as the value of the zinc deposition amount setting signal Zr increases, and outputs the increased value.

The corrected first arc current setting circuit IA1R receives the zinc deposition amount setting signal Zr as an input and increases the value of the first arc current setting signal Ia1r as the value of the zinc deposition amount setting signal Zr increases, and outputs the increased value.

Since the timing chart showing the arc welding control method according to the second embodiment of the present invention is similar to that of the above-recited FIG. 2, the description thereof will not be repeated. However, the point that the value of the first arc period Ta1 and/or the first arc current Ia1 changes according to the value of the zinc deposition amount setting signal Zr is different.

According to the second embodiment, the value of the first arc period and/or the first arc current Ia1 changes according to the zinc deposition amount per unit area of the base material. Accordingly, the amount of heat input to the molten pool during the first arc period can be optimized according to the zinc deposition amount of the base material. Thus, the discharge effect of the zinc vapor can be optimized according to the zinc deposition amount.

Third Embodiment

In the invention according to a third embodiment, the waveform parameter of the feed speed is set so that the average value of the repetition frequency of the forward feed period and the reverse feed period is in the range of 70 Hz to 90 Hz.

Figure 4:
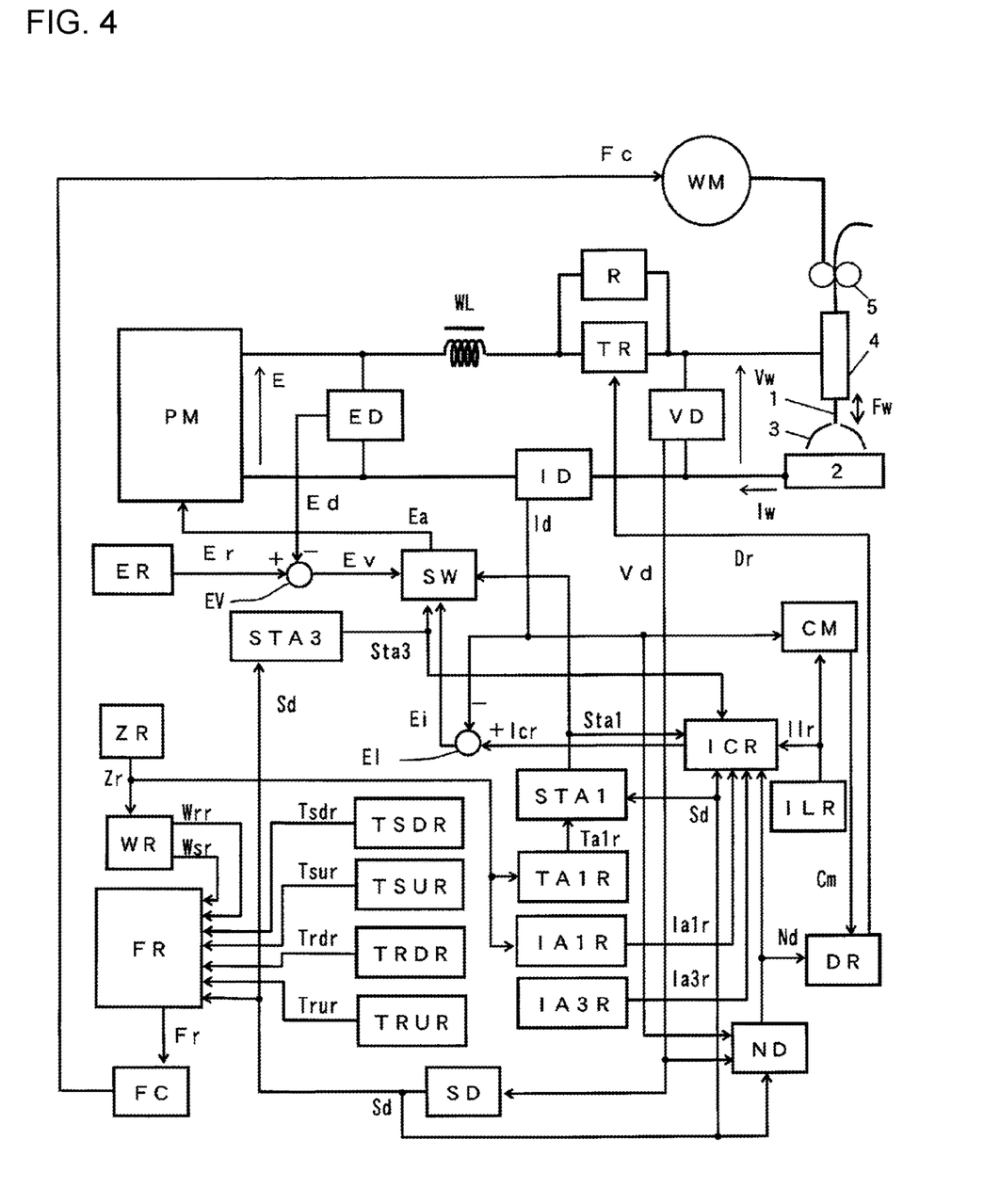
FIG. 4 is a block diagram of a welding power source for performing an arc welding control method according to a third embodiment of the present invention.

FIG. 4 is a block diagram of a welding power source for performing an arc welding control method according to the third embodiment of the present invention. FIG. 4 corresponds to FIG. 3 described above, in which the same reference numerals are attached to the same blocks, and description thereof will not be repeated. In FIG. 4, the forward feed peak value setting circuit WSR and the reverse feed peak value setting circuit WRR in FIG. 3 are deleted, and a forward/reverse feed peak value setting circuit WR is added. Hereinafter, the block will be described below with reference to FIG. 4.

The forward/reverse feed peak value setting circuit WR outputs a forward feed peak value setting signal Wsr and a reverse feed peak value setting signal Wrr calculated by a predetermined function to which the zinc deposition amount setting signal Zr is input. In this function, the values of the forward feed peak value setting signal Wsr and the reverse feed peak value setting signal Wrr decrease as the value of the zinc deposition amount setting signal Zr increases. This function is set so that the average value of the repetition frequency between the forward feed period and the reverse feed period of the feed speed Fw is in the range from 70 Hz to 90 Hz. More preferably, this function is set so that the frequency is in the range from 75 Hz to 85 Hz. Since the values of the forward feed peak value setting signal Wsr and the reverse feed peak value setting signal Wrr decrease as the value of the zinc deposition amount setting signal Zr increases, the frequency changes so as to be low within the above range.

Since the timing chart showing the arc welding control method according to the third embodiment of the present invention is similar to that of FIG. 2, the description thereof will not be repeated. However, the following points are different. According to the third embodiment, the waveform parameter of the feed speed is set so that the average value of the repetition frequency of the forward feed period and the reverse feed period of the feed speed is in the range of 70 Hz to 90 Hz. The waveform parameters of the feed speed are at least the forward feed peak value and the reverse feed peak value. When the frequency is smaller than 70 Hz, the heat input to the base material during the arc period is excessive and the ejection of the zinc vapor is severe. As a result, the welding state is unstable, and the spatter generation amount also increases. When the frequency is more than 90 Hz, the arc period is shortened and it is difficult to secure the third arc period. As a result, the spatter generation amount increases and the welding state also deteriorates. When the frequency is in the range from 75 Hz to 85 Hz, the welding state is further stabilized and the spatter generation amount is further reduced.

Further, the waveform parameter is set so that the average value of the frequency is lowered as the zinc deposition amount per unit area of the galvanized steel sheet increases. Since the ejection of zinc vapor is severe as the zinc deposition amount of the base material increases, the welding state is stabilized by making the average value of the frequency low within the above range.

INDUSTRIAL APPLICABILITY

According to the present invention, an arc welding control method can be provided, which is capable of stabilizing the welding state and reducing the spatter generation amount in arc welding in which the material of a base material is a galvanized steel sheet and the feed speed of the welding wire is alternately switched between the forward feed period and the reverse feed period.

Although the present invention has been described with reference to specific embodiments, the present invention is not limited to this embodiment, and various modifications are possible without departing from the technical concept of the disclosed invention.

This application is based on a Japanese patent application (Japanese Patent Application No. 2016-213269) filed on Oct. 31, 2016 and a Japanese patent application (Japanese Patent Application No. 2016-232039) filed on Nov. 30, 2016, the contents of which are incorporated herein by reference.

DESCRIPTION OF REFERENCE NUMERALS

1. Welding wire
2. Base material
3. Arc
4. Welding torch
5. Feed roll
CM Current comparison circuit
Cm Current comparison signal
DR Drive circuit
Dr Drive signal
E Output voltage
Ea Error amplification signal
ED Output voltage detection circuit
Ed Output voltage detection signal
EI Current error amplification circuit
Ei Current error amplification signal
ER Output voltage setting circuit
Er Output voltage setting signal
EV Voltage error amplification circuit
Ev Voltage error amplification signal
FC Feed control circuit
Fc Feed control signal
FR Feed speed setting circuit
Fr Feed speed setting signal
Fw Feed speed
Ia1 First arc current
IA1R (Corrected) first arc current setting circuit
Ia1r First arc current setting signal
Ia2 Second arc current
Ia3 Third arc current
IA3R (Corrected) third arc current setting circuit Ia3r Third arc current setting signal
ICR Current control setting circuit
Icr Current control setting signal
ID Current detection circuit
Id Current detection signal
ILR Low level current setting circuit
Ilr Low level current setting signal
Iw Welding current
ND Constriction detection circuit
Nd Constriction detection signal
PM Power source main circuit
R Current-limiting resistor
SD Short circuit determination circuit
Sd Short circuit determination signal
STA1 First arc period circuit
Sta1 First arc period signal
STA3 Third arc period circuit
Sta3 Third arc period signal
SW Power source characteristic switching circuit
Ta1 First arc period
TA1R (Corrected) first arc period setting circuit
Ta1r First arc period setting signal
Ta2 Second arc period
Ta3 Third arc period
Tc Delay period
Td Current drop time
TR Transistor
Trd Reverse feed deceleration period
TRDR Reverse feed deceleration period setting circuit
Trdr Reverse feed deceleration period setting signal
Trp Reverse feed peak period
Tru Reverse feed acceleration period
TRUR Reverse feed acceleration period setting circuit
Trur Reverse feed acceleration period setting signal
Tsd Forward feed deceleration period
TSDR Forward feed deceleration period setting circuit
Tsdr Forward feed deceleration period setting signal
Tsp Forward feed peak period
Tsu Forward feed acceleration period
TSUR Forward feed acceleration period setting circuit
Tsur Forward feed acceleration period setting signal
VD Voltage detection circuit
Vd Voltage detection signal
Vw Welding voltage
WL Reactor
WM Feed motor
WR Forward/reverse feed peak value setting circuit
Wrp Reverse feed peak value
WRR Reverse feed peak value setting circuit
Wrr Reverse feed peak value setting signal
Wsp Forward feed peak value
WSR Forward feed peak value setting circuit
Wsr Forward feed peak value setting signal
ZR Zinc deposition amount setting circuit
Zr Zinc deposition amount setting signal

The invention claimed is:

1. An arc welding control method that comprises controlling welding in which a material of a base material is a galvanized steel sheet, a feed speed of a welding wire is alternately switched between a forward feed period and a reverse feed period, and a short circuit period and an arc period are repeated, wherein during the arc period, a first arc period during which a first arc current Ia1 is applied, a second arc period during which a second arc current Ia2 is applied, and a third arc period during which a third arc current Ia3 is applied are switched over time, to control so as to be Ia1>Ia2>Ia3, wherein constant current control is performed during the first arc period, and wherein constant current control is performed during the third arc period, and wherein at least one of a value of a time length of the first arc period and a value of the first arc current Ia1 is determined according to a zinc deposition amount per unit area of the base material.

2. The arc welding control method according to claim 1, wherein constant voltage control is performed during the second arc period.

3. The arc welding control method according to claim 2, wherein at least one of the value of the time length of the first arc period and the value of the first arc current Ia1 is set to a value such that zinc vapor does not remain in a molten pool after being discharged from the molten pool.

4. The arc welding control method according to claim 2, wherein a waveform parameter of the feed speed is set so that an average value of repetition frequencies of the forward feed period and the reverse feed period is in a range of 70 Hz to 90 Hz.

5. The arc welding control method according to claim 4, wherein the waveform parameter is at least a forward feed peak value and a reverse feed peak value.

6. The arc welding control method according to claim 5, wherein the waveform parameter is set so that the average value of the repetition frequencies lowers as the zinc deposition amount per unit area of the base material increases.

7. The arc welding control method according to claim 4, wherein the waveform parameter is set so that the average value of the repetition frequencies lowers as the zinc deposition amount per unit area of the base material increases.

8. The arc welding control method according to claim 1, wherein at least one of the value of the time length of the first arc period and the value of the first arc current Ia1 is set to a value such that zinc vapor does not remain in a molten pool after being discharged from the molten pool.

9. The arc welding control method according to claim 1, wherein a waveform parameter of the feed speed is set so that an average value of repetition frequencies of the forward feed period and the reverse feed period is in a range of 70 Hz to 90 Hz.

10. The arc welding control method according to claim 9, wherein the waveform parameter is at least a forward feed peak value and a reverse feed peak value.

11. The arc welding control method according to claim 10, wherein the waveform parameter is set so that the average value of the repetition frequencies lowers as the zinc deposition amount per unit area of the base material increases.

12. The arc welding control method according to claim 9, wherein the waveform parameter is set so that the average value of the repetition frequencies lowers as the zinc deposition amount per unit area of the base material increases.

* * * * *